UNITED STATES PATENT OFFICE.

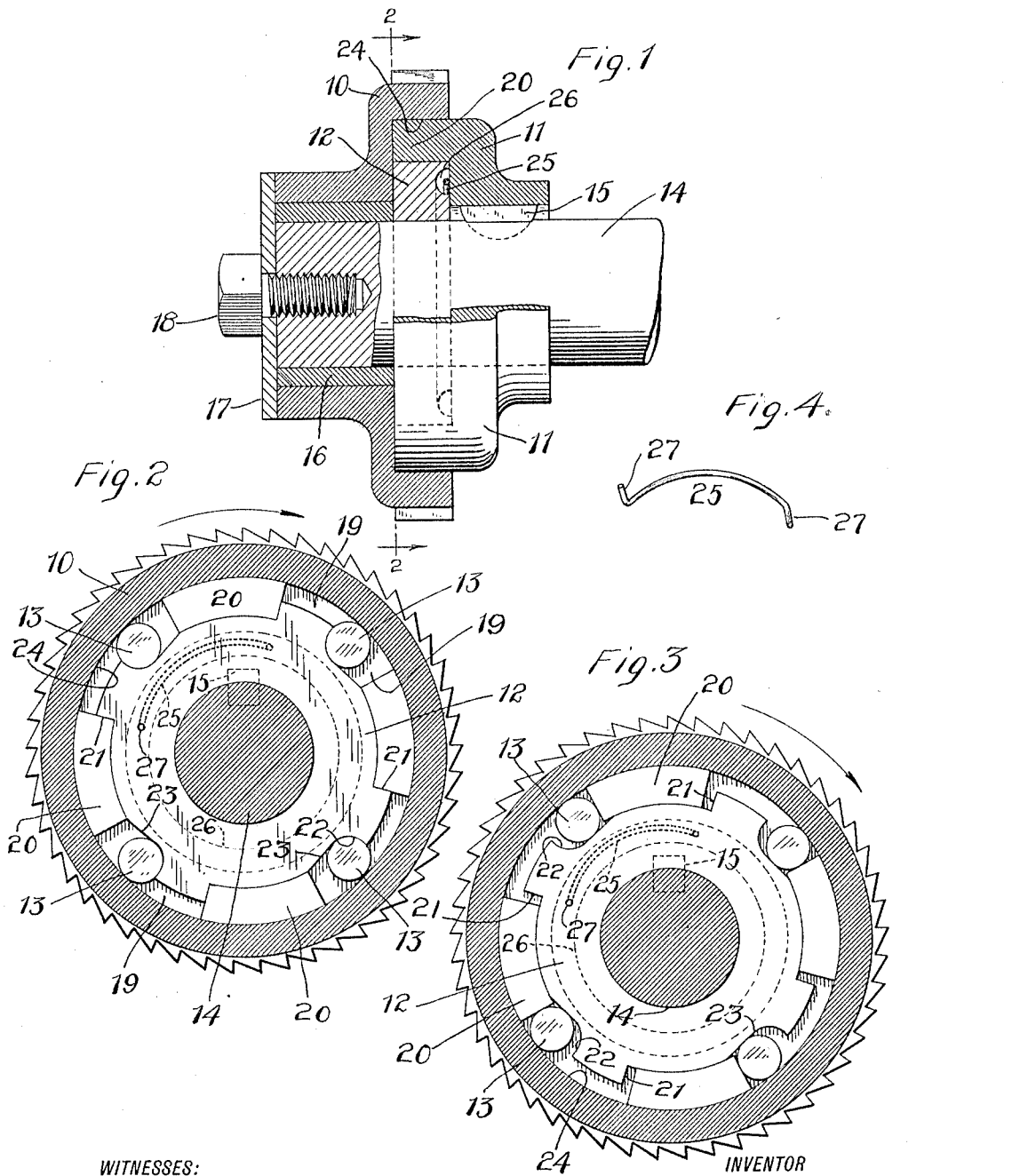

HUBERT MEREDITH-JONES, OF NEW YORK, N. Y., ASSIGNOR TO COLUMBIA NUT AND BOLT COMPANY, INCORPORATED, OF BRIDGEPORT, CONNECTICUT, A CORPORATION OF NEW YORK.

SHAFT DRIVING AND RELEASING MECHANISM.

1,040,563.     Specification of Letters Patent.     Patented Oct. 8, 1912.

Application filed March 11, 1912. Serial No. 682,880.

*To all whom it may concern:*

Be it known that I, HUBERT MEREDITH-JONES, a subject of the King of Great Britain, residing at New York city, county of New York, State of New York, have invented an Improvement in Shaft Driving and Releasing Mechanism, of which the following is a specification.

This invention relates to mechanism for driving and for automatically releasing shafts, which shall be adapted for general use, as in connection with starting mechanism either mechanical, electrical or compression, upon explosive engines, and the invention has for its object to provide means for detaching a shaft from driving mechanism the instant the shaft commences to move forward at a greater speed than that applied to it by the driving mechanism or to move backward as when normal action of the engine is established and the shaft commences to rotate forward, or when it is driven backward by a back-fire, thus preventing the danger of injury to the operator or to the mechanism in "cranking up," or in operating any type of starting mechanism.

With these and other objects in view, I have devised the novel driving and releasing mechanism of which the following description, in connection with the accompanying drawing, is a specification, reference characters being used to indicate the several parts.

Figure 1 is a view partly in elevation and partly in section illustrating the construction of my novel mechanism. Fig. 2, a section on the line 2—2 in Fig. 1, looking in the direction of the arrows, showing the parts in the normal position, that is with the shaft running free. Fig. 3, a similar view showing the parts in the driving position; and Fig. 4 is a perspective of the spring detached.

My novel mechanism comprises essentially a driving hub 10, a driven hub 11, a locking disk 12 and rollers 13 lying intermediate the driving hub and the locking disk and adapted to drive or release a shaft 14 under the conditions which I shall presently describe. The driven hub is rigidly secured to the shaft in any suitable manner as by a key 15. The driving hub is shown as provided with a bearing 16 within which the shaft rotates freely and the parts are shown as retained in position on the shaft by a washer 17 and screw 18 which passes through the washer and engages the end of the shaft. The driving hub is provided in its face with a central recess 19, which partly receives the driven hub. Rotary motion may be imparted to the driving hub in any suitable manner. I have shown the periphery of this hub as provided with ratchet teeth which are adapted to be engaged by any suitable starting mechanism, as ordinary cranking mechanism or an electrical, compression, or mechanical starter of any ordinary or preferred type. The driven hub is provided at its periphery with flange sections 20 which lie in recess 19. The locking disk is loose on the shaft and is provided on its periphery with shoulders 21 which are adapted to be engaged by the flange sections and with peripheral recesses 22 deepest at one end and providing inclines 23, all of which extend in the same direction from the deep portions of the recesses. The rollers lie between the wall 24 of the recess in the driving hub and the inclines, and when power is applied to the driving hub to start the shaft, the rollers through the frictional engagement of wall 24 are caused to travel up the inclines and wedge between the inclines and the wall. This will carry the locking disk forward and an instant later the rollers will engage the flange sections upon the driven hub, as in Fig. 3. As the driven hub is keyed to the shaft the rotary movement of the driving hub is thus transmitted thereto. The instant the power of an engine, however, not shown, is communicated to the shaft, its rotation will be faster than the rotation of the driving hub and the shaft will run away from the driving hub which will be instantly disconnected through the engagement of the flange sections with the shoulders on the locking disk, this for the reason that as soon as the locking disk is carried forward by the flange sections the rollers will necessarily drop back as it were into the deep portions of the recesses, thus releasing the grip of the rollers and unlocking the driving hub from the locking disk, leaving the parts in the position shown in Fig. 2. Should the engine back-fire, precisely the same releasing of the driving hub takes place this time through the action of the flange sections upon the rollers. Suppose the parts to be in the position shown in Fig. 3; should the engine back-fire, the shaft, driven hub and flange sections will be driven backward and the rollers will be forced backward down the inclines by the flange sections which will release the driving hub and leave the shaft free.

In order to prevent loose movement of the parts and to retain them in their normal position, that is, in the position shown in Fig. 2, I provide a spring 25 shown as lying in a groove 26 in the face of the locking disk and as provided with oppositely extending engaging ends 27, one of which engages a hole in the locking disk and the other a hole in the driven hub. When power is applied to the driving hub to start the shaft, the action is necessarily against the power of the spring which is bowed in the recess, the parts will then be in the position shown in Fig. 3. As soon as the shaft is carried forward by the engine, however, the parts will be returned to the position shown in Fig. 2, in which position they will be retained by the spring.

Having thus described my invention, I claim:

1. Mechanism of the character described, comprising a driving hub having an inner peripheral wall, a driven hub having flange sections, a locking disk having peripheral shoulders adapted to be engaged by the flange sections and peripheral recesses deepest at one end and providing inclines and rollers between the inclines and the wall of the driving hub, rotary movement of the driving hub causing the rollers to travel up the inclines and lock the disk to the driving hub and the rollers to engage the flange sections and communicate motion to the driven hub, increased motion of the driven hub causing the flange sections to engage the shoulders on the disk and carry the latter forward so that the rollers will pass into the deep portions of the recesses leaving the driving hub disconnected, and backward movement of the driving hub causing the flange sections to force the rollers down the inclines into the deep portions of the recesses disconnecting the driving hub as before.

2. Mechanism of the character described, comprising a driving hub having a recess in its face leaving a peripheral wall, a driven hub having flange sections lying in said recess, a locking disk having peripheral shoulders adapted to be engaged by the flange sections and peripheral recesses deepest at one end and providing inclines and rollers between said inclines and wall, substantially as described, for the purpose specified.

3. Mechanism of the character described, comprising a driving hub having an inner peripheral wall, a driven hub having flange sections, a locking disk having peripheral shoulders adapted to be engaged by the flange sections and peripheral recesses deepest at one end and providing inclines and rollers between the inclines and the wall of the driving hub, and a spring for retaining the driven hub and locking disk in their normal position.

4. Mechanism of the character described, comprising a driving hub having an inner peripheral wall, a driven hub having flange sections, a locking disk having peripheral shoulders adapted to be engaged by the flange sections, peripheral recesses deepest at one end and providing inclines, and a groove in its face, rollers between the inclines and the wall of the driving hub and a spring in the groove, one end of which is connected to the disk and the other to the driven hub, substantially as described, for the purpose specified.

5. The combination with a shaft and a driven hub secured thereto and provided with flange sections, of a driving hub loose on the shaft and provided with an inner peripheral wall, a locking disk loose on the shaft and having peripheral shoulders and peripheral recesses deepest at one end, and providing inclines, and rollers between the inclines and the peripheral wall, whereby motion of the driving hub is communicated to the other parts and when the shaft turns faster than the driving hub or turns backward the driving hub is released.

6. The combination with the shaft and a driven hub secured thereto and provided with flange sections, of a driving hub loose on the shaft and provided with an inner peripheral wall, a locking disk loose on the shaft and having peripheral shoulders and peripheral recesses, deepest at one end and providing inclines, rollers between the inclines and the peripheral walls, for the purpose set forth, and a spring for retaining the driven hub and locking disk in their normal position.

In testimony whereof I affix my signature in presence of two witnesses.

HUBERT MEREDITH-JONES.

Witnesses:
S. W. ATHERTON,
M. L. HAGGEMAN.

Copies of this patent may be obtained for five cents each, by addressing the "Commissioner of Patents, Washington, D. C."